United States Patent [19]
Jordan

[11] Patent Number: 5,772,286
[45] Date of Patent: Jun. 30, 1998

[54] WHEEL DUST FILTER

[76] Inventor: Jimmy Jordan, 228 Dodgen Pl., Mabelton, Ga. 30059

[21] Appl. No.: 800,790

[22] Filed: Feb. 14, 1997

[51] Int. Cl.$^6$ ...................................................... B60B 7/00
[52] U.S. Cl. ...................... 301/37.1; 301/6.3; 301/37.37; 188/218 A
[58] Field of Search .......................... 301/6.1, 6.3, 6.91, 301/37.1, 37.37, 37.42; 188/218 A; 210/348, 542

[56] References Cited

U.S. PATENT DOCUMENTS

| 4,164,273 | 8/1979 | McElroy .............................. 188/218 A |
| 4,207,971 | 6/1980 | Ishikawa et al. .................... 188/218 A |
| 4,473,139 | 9/1984 | Oka et al. ............................. 188/71.6 |
| 4,484,667 | 11/1984 | Bottieri, Jr. ......................... 188/218 A |
| 4,807,498 | 2/1989 | Kleiser et al. ............................ 81/56 |

FOREIGN PATENT DOCUMENTS

| 204433 | 12/1986 | European Pat. Off. ............ 188/218 A |
| 4008333 | 9/1991 | Germany ............................. 301/37.37 |
| 72967 | 6/1978 | Japan .................................. 188/218 A |
| 3173701 | 7/1988 | Japan ..................................... 301/37.1 |
| 2276216 | 9/1994 | United Kingdom ............... 188/218 X |

*Primary Examiner*—Russell D. Stormer
*Attorney, Agent, or Firm*—Joseph N. Breaux

[57] ABSTRACT

A wheel dust filter including a central mounting plate having a central mounting hole formed therethrough and a plurality of lug apertures formed through the mounting plate and spaced around the central mounting hole; a circular frame rim having four sequentially spaced, rim filter receiving channels; four radially projecting frame rim supports each having two rim support filter receiving channels, each rim support being in connection between the frame rim and the central mounting plate in a manner to define four filter apertures; and four filter elements constructed from open cell foam, each filter element being positioned within one of the four filter apertures in a manner such that portions of the perimeter edge of each filter are positioned within a rim filter receiving channel and two rim support filter receiving channels. In use, the wheel dust filter is positioned over the brake assembly of an automobile wheel assembly by inserting the lugs of the wheel assembly through the lug apertures prior to positioning the wheel onto the wheel assembly in the convention fashion. The filter elements provide a pathway for cooling air to reach the brake assembly while minimizing migration of brake dust from the brake assembly to the exterior surface of the wheel.

16 Claims, 2 Drawing Sheets

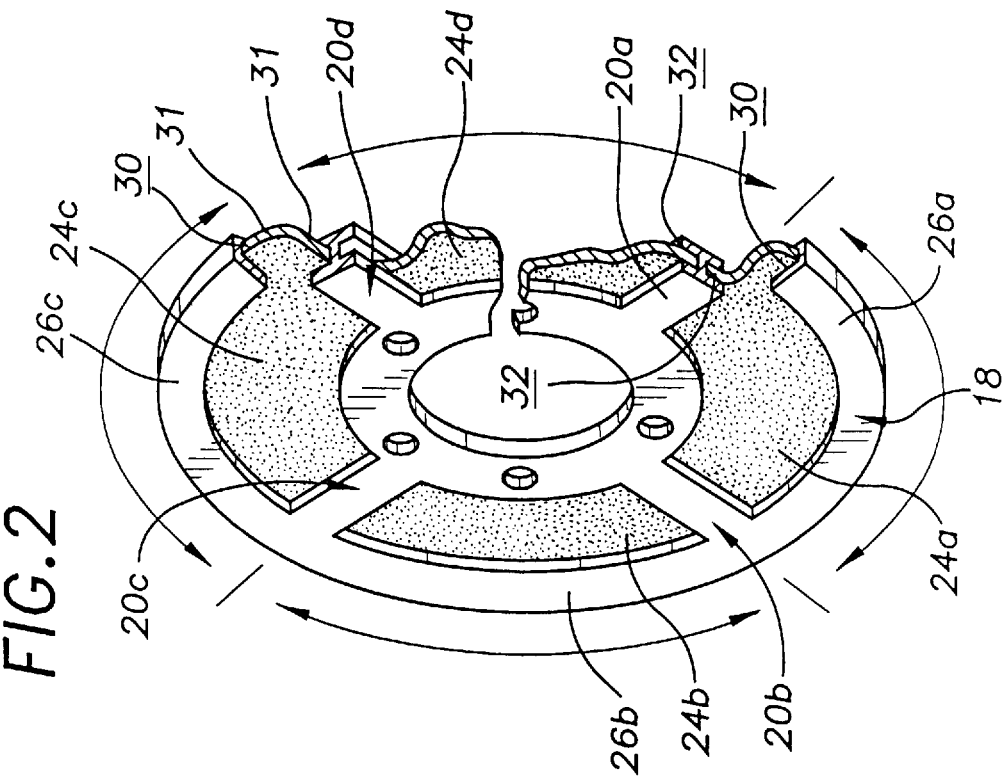
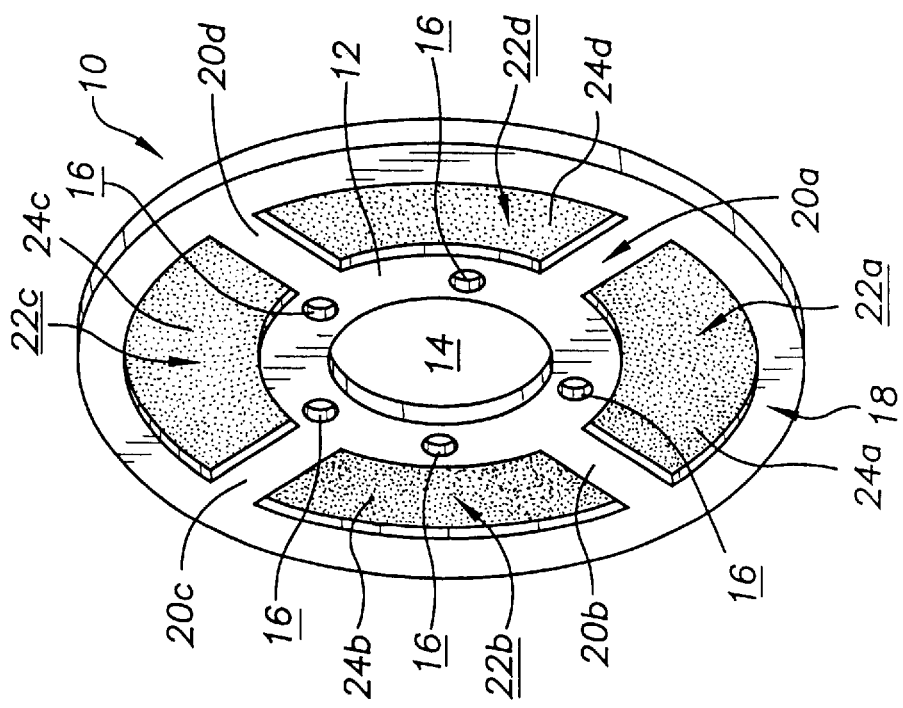

WHEEL DUST FILTER

TECHNICAL FIELD

The present invention relates to filtering devices and more particularly to a wheel dust filter for an automobile that is placed between the hub of the disk brake rotor and the wheel of the automobile that has a central mounting plate having a central mounting hole defined therethrough and a plurality of lug apertures formed through the mounting plate and spaced around the central mounting hole; a circular frame rim having four sequentially spaced, rim filter receiving channels; four radially projecting frame rim supports each having two rim support filter receiving channels, each rim support being in connection between the frame rim and the central mounting plate in a manner to define four filter apertures; and four filter elements constructed from open cell foam, each filter element being positioned within one of the four filter apertures in a manner such that portions of the perimeter edge of each filter element are positioned within a rim filter receiving channel and two rim support filter receiving channels.

BACKGROUND OF THE INVENTION

Many automobiles have wheels that accumulate brake dust from the wheel brake assembly. The brake dust is created when particles of the brake shoe are abraded from the brake shoe surface during braking of the automobile. Because the accumulated brake dust can detract from the appearance of the automobile, it would be a benefit to have a device for preventing this accumulation. Because ease of installation is always an import consideration, it would be a further benefit to have a device for preventing accumulation of brake dust on the wheel of an automobile that was easily installed. In addition, because the holes formed through the wheels provide a pathway for cooling air to cool the brake assembly, it would be a further benefit to have a device for preventing the accumulation of brake dust on the wheel that allowed air transmission through the wheel while preventing the passage of brake dust particles.

SUMMARY OF THE INVENTION

It is thus an object of the invention to provide a wheel dust filter that prevents the accumulation of brake dust on an automobile wheel.

It is a further object of the invention to provide a wheel dust filter that is easily installed.

It is a still further object of the invention to provide a wheel dust filter that allows air transmission through the wheel while preventing the passage of brake dust particles.

It is a still further object of the invention to provide a wheel dust filter that is placed between the hub of the disk brake rotor and the wheel of an automobile tire that has a central mounting plate having a central mounting hole defined therethrough and a plurality of lug apertures formed through the mounting plate and spaced around the central mounting hole; a circular frame rim having four sequentially spaced, rim filter receiving channels; four radially projecting frame rim supports each having two rim support filter receiving channels, each rim support being in connection between the frame rim and the central mounting plate in a manner to define four filter apertures; and four filter elements constructed from open cell foam, each filter element being positioned within one of the four filter apertures in a manner such that portions of the perimeter edge of each filter element are positioned within a rim filter receiving channel and two rim support filter receiving channels.

It is a still further object of the invention to provide a wheel dust filter that accomplishes some or all of the above objects in combination.

Accordingly, a wheel dust filter is provided. The wheel dust filter comprises a central mounting plate having a central mounting hole formed therethrough and a plurality of lug apertures formed through the mounting plate and spaced around the central mounting hole; a circular frame rim having four sequentially spaced, rim filter receiving channels; four radially projecting frame rim supports each having two rim support filter receiving channels, each rim support being in connection between the frame rim and the central mounting plate in a manner to define four filter apertures; and four filter elements constructed from open cell foam, each filter element being positioned within one of the four filter apertures in a manner such that portions of the perimeter edge of each filter are positioned within a rim filter receiving channel and two rim support filter receiving channels. In a preferred embodiment the central mounting plate, the frame rim supports and the frame rim are integrally formed from a plastic material. In another preferred embodiment, the perimeter edges of each of the filter elements is ultrasonically welded to the central mounting plate, two of the frame rim supports and the circular frame rim.

In use, the wheel dust filter is positioned over the brake assembly of an automobile wheel assembly by inserting the lugs of the wheel assembly through the lug apertures prior to positioning the wheel onto the wheel assembly in the convention fashion. The filter elements provide a pathway for cooling air to reach the brake assembly while minimizing migration of brake dust from the brake assembly to the exterior surface of the wheel.

BRIEF DESCRIPTION OF DRAWINGS

For a further understanding of the nature and objects of the present invention, reference should be make to the following detailed description, taken in conjunction with the accompanying drawings, in which like elements are given the same or analogous reference numbers and wherein:

FIG. 1 is a perspective view of an exemplary embodiment of the wheel dust filter of the present inventions showing the central mounting hole defined through the central mounting plate; five lug apertures formed through the central mounting plate and spaced around the central mounting hole; the circular frame rim; the four radially projecting frame rim supports integrally formed with and between the frame rim and the central mounting plate in a manner to define four filter apertures; and the four filter elements, each positioned within one of the four filter apertures.

FIG. 2 is a partial cut-away perspective view of the wheel dust filter of FIG. 1 showing portions of one of the filter element perimeters positioned spaced within a rim filter receiving channel and a rim support filter receiving channel.

DESCRIPTION OF THE EXEMPLARY EMBODIMENT

Figure 4:
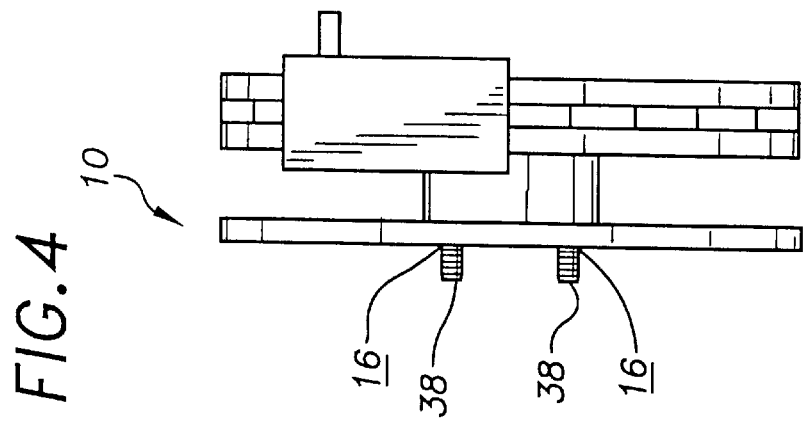
FIG. 4 is a side view showing the wheel dust filter of FIG. 1 positioned onto the representative automotive brake unit of FIG. 3.

FIG. 1 shows an exemplary embodiment of the wheel dust filter of the present inventions generally designated by the numeral 10. Wheel dust filter 10 includes a central mounting plate 12 having a central mounting hole 14 and five lug apertures 16 formed therethrough; a circular frame rim, generally designated by the designation 18; four radially projecting frame rim supports, generally designated by the designations 20a–d; four equal sized and identically shaped filter apertures 22a–d; and four equal sized and identically shaped filter elements 24a–d. In this embodiment central mounting plate 12, circular frame rim 18, and the four radially projecting frame rim supports 20a–d are integrally formed of ABS plastic and are injection molded. Filter elements 22a–d are identically shaped, die-cut sections of open cell foam filter material.

With reference to FIG. 2, circular frame rim 18 is divided into four equal arc length rim sections 26a–d (rim section 26d shown in FIG. 3) that are defined by radially projecting rim supports 20a–d. Each rim section 26a–d has a rim filter receiving channel 30 running along the interior surface thereof sized to received an edge portion 31 of the perimeter edge of a filter element 24a–d. Each radially projecting frame rim support 20a–d has two rim support filter receiving channels 32 running along opposed side edge surfaces thereof. Each rim support filter receiving channel 32 is sized to receive an edge portion 31 of the perimeter edge of a filter element 24a–d. In this embodiment, filter elements 24a–d are each ultrasonically welded to two adjacent frame rim supports 24a–d and a rim section 26a–d. Although filter elements 24a–d are ultrasonically welded in place in this exemplary embodiment, adhesives and other fastening mechanisms can also be used advantageously to hold filter elements 24a–d in position across filter apertures 24a–d.

Figure 3:
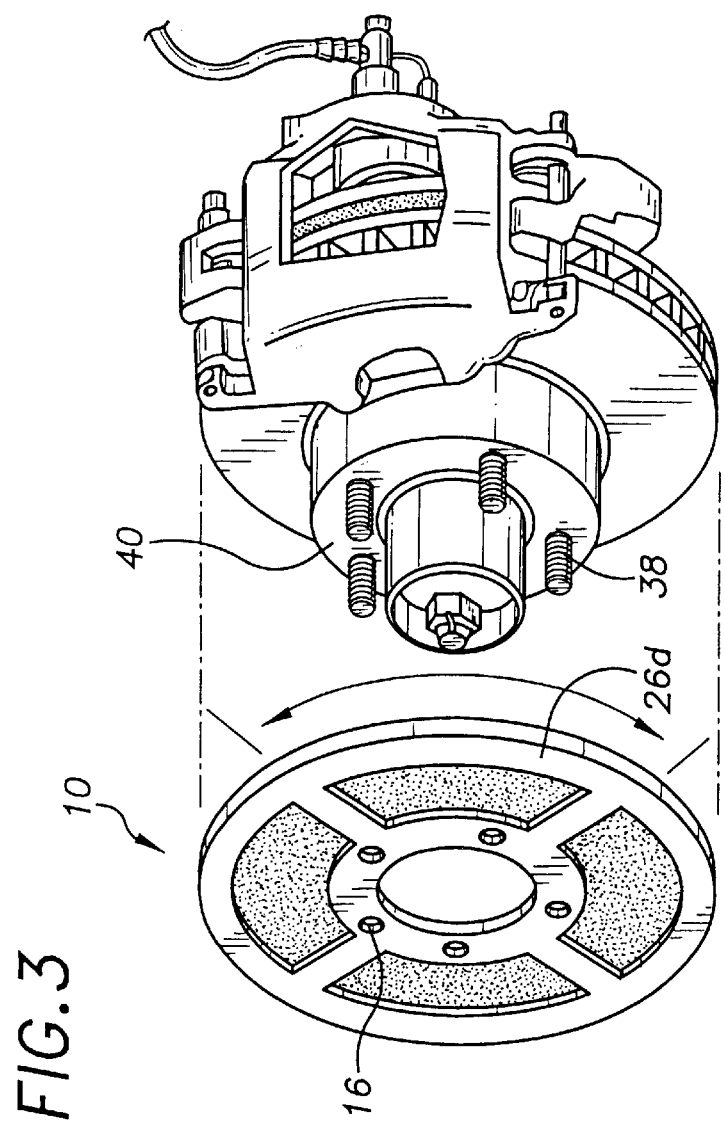
FIG. 3 is an exploded view showing positioning of the wheel dust filter of FIG. 1 onto the hub of a representative automotive brake unit.

With reference to FIG. 3, wheel dust filter 10 is installed by positioned stud apertures 16 over the studs 38 that extend from disk brake rotor 40. The conventional automobile wheel is then placed over studs 38 and secured in place with lug nuts in the conventional manner. FIG. 4 shows wheel dust filter 10 with lugs 38 positioned through lug apertures 16.

It can be seen from the preceding description that a wheel dust filter has been provided that prevents the accumulation of brake dust on an automobile wheel; that is easily installed; that allows air transmission through the wheel while preventing the passage of brake dust particles; and that has a central mounting plate having a central mounting hole defined therethrough and a plurality of lug apertures formed through the mounting plate and spaced around the central mounting hole; a circular frame rim having four sequentially spaced, rim filter receiving channels; four radially projecting frame rim supports each having two rim support filter receiving channels, each rim support being in connection between the frame rim and the central mounting plate in a manner to define four filter apertures; and four filter elements constructed from open cell foam, each filter element being positioned within one of the four filter apertures in a manner such that portions of the perimeter edge of each filter element are positioned within a rim filter receiving channel and two rim support filter receiving channels.

It is noted that the embodiment of the wheel dust filter described herein in detail for exemplary purposes is of course subject to many different variations in structure, design, application and methodology. Because many varying and different embodiments may be made within the scope of the inventive concept(s) herein taught, and because many modifications may be make in the embodiment herein detailed in accordance with the descriptive requirements of the law, it is to be understood that the details herein are to be interpreted as illustrative and not in a limiting sense.

What is claimed is:
1. A wheel dust filter comprising:
   a central mounting plate having a central mounting hole formed therethrough and a plurality of lug apertures formed through said mounting plate and spaced around said central mounting hole;
   a circular frame rim having four sequentially spaced, rim filter receiving channels;
   four radially projecting frame rim supports each having two rim support filter receiving channels, each rim support being in connection between said frame rim and said central mounting plate in a manner to define four filter apertures; and
   four filter elements constructed from open cell foam, each filter element being positioned within one of said four filter apertures in a manner such that edge portions of the perimeter edge of each filter element are positioned within a said rim filter receiving channel and two of said rim support filter receiving channels.
2. The wheel dust filter of claim 1, wherein:
said central mounting plate, said frame rim supports and said frame rim are integrally formed from a plastic material.
3. The wheel dust filter of claim 1, wherein:
each said filter elements is ultrasonically welded to said central mounting plate, tow of said frame rim supports and said circular frame rim.
4. The wheel dust filter of claim 1 wherein:
all of said four filter apertures are equal in size and identically shaped.
5. The wheel dust filter of claim 1 wherein:
all of said four filter elements are equal in size and identically shaped.
6. The wheel dust filter of claim 2, wherein:
each said filter elements is ultrasonically welded to said central mounting plate, two of said frame rim supports and said circular frame rim.
7. The wheel dust filter of claim 2 wherein:
all of said four filter apertures are equal in size and identically shaped.
8. The wheel dust filter of claim 2 wherein:
all of said four filter elements are equal in size and identically shaped.
9. The wheel dust filter of claim 6 wherein:
all of said four filter apertures are equal in size and identically shaped.
10. The wheel dust filter of claim 6 wherein:
all of said four filter elements are equal in size and identically shaped.
11. The wheel dust filter of claim 9 wherein:
all of said four filter elements are equal in size and identically shaped.
12. The wheel dust filter of claim 7 wherein:
all of said four filter elements are equal in size and identically shaped.
13. The wheel dust filter of claim 3 wherein:
all of said four filter apertures are equal in size and identically shaped.
14. The wheel dust filter of claim 3 wherein;
all of said four filter elements are equal in size and identically shaped.
15. The wheel dust filter of claim 13 wherein:
all of said four filter elements are equal is size and identically shaped.
16. The wheel dust filter of claim 4 wherein:
all of said four filter elements are equal in size and identically shaped.

* * * * *